United States Patent [19]

Marsh

[11] 3,721,080
[45] March 20, 1973

[54] CROP WINDROWING APPARATUS
[76] Inventor: Preston L. Marsh, Route 1, Hope, Mich.
[22] Filed: Oct. 2, 1970
[21] Appl. No.: 77,428

[52] U.S. Cl. ..................56/364, 56/16.4, 56/372
[51] Int. Cl. ...................................A01d 89/02
[58] Field of Search.......56/14.5, 192, 364, 366, 372, 56/14.4, 16.4

[56] References Cited

UNITED STATES PATENTS

| | | | |
|---|---|---|---|
| 3,060,665 | 10/1962 | Escher | 56/16.4 |
| 3,451,530 | 6/1969 | Shumway | 56/16.4 |
| 1,896,626 | 2/1933 | Innes | 56/364 |
| 2,133,143 | 10/1938 | Innes | 56/364 |
| 2,644,292 | 7/1953 | Oberholtz et al. | 56/364 |
| 2,770,937 | 11/1956 | Huddle | 56/192 |

Primary Examiner—Antonio F. Guida
Attorney—Learman & McCulloch

[57] ABSTRACT

Apparatus for windrowing crops including a rotatable tine assembly for lifting severed crops and moving them rearwardly over a stripper drum rotatably mounted about an axis offset from the rotational axis of the tine assembly and which strips the crops from the tine assembly and propels them further rearwardly onto conveyor mechanism that gathers the crops and discharges them at the rear of the machine in a windrow. In one embodiment, the drum and tine assembly are individually driven and the drum is provided with a plurality of curvilinear grain collecting troughs which are mounted on longitudinally extending, circumferentially spaced support bars having openings therebetween for receiving the individual tines of the tine assembly. In a modified embodiment, the tine assembly drives the drum.

22 Claims, 5 Drawing Figures

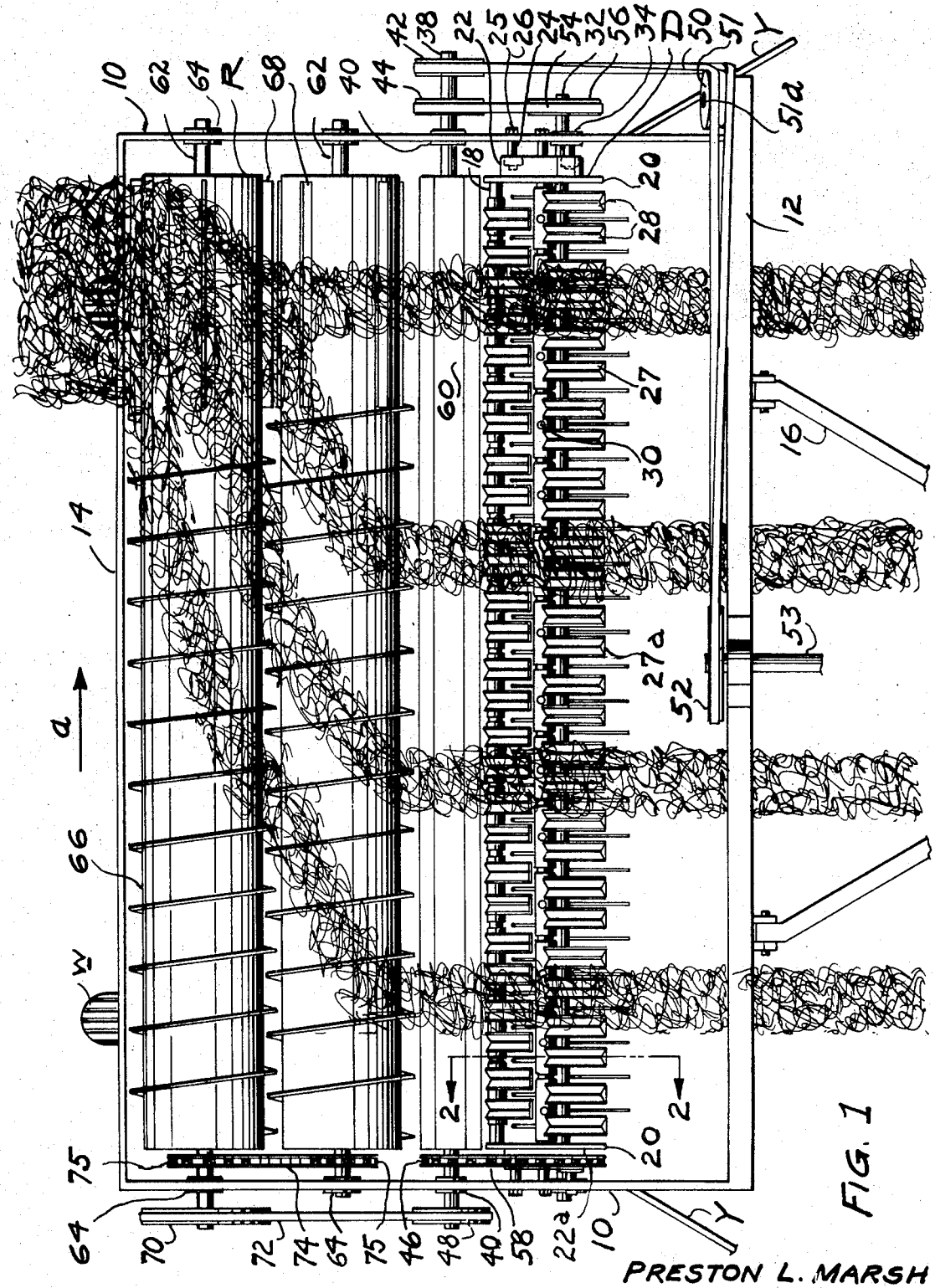

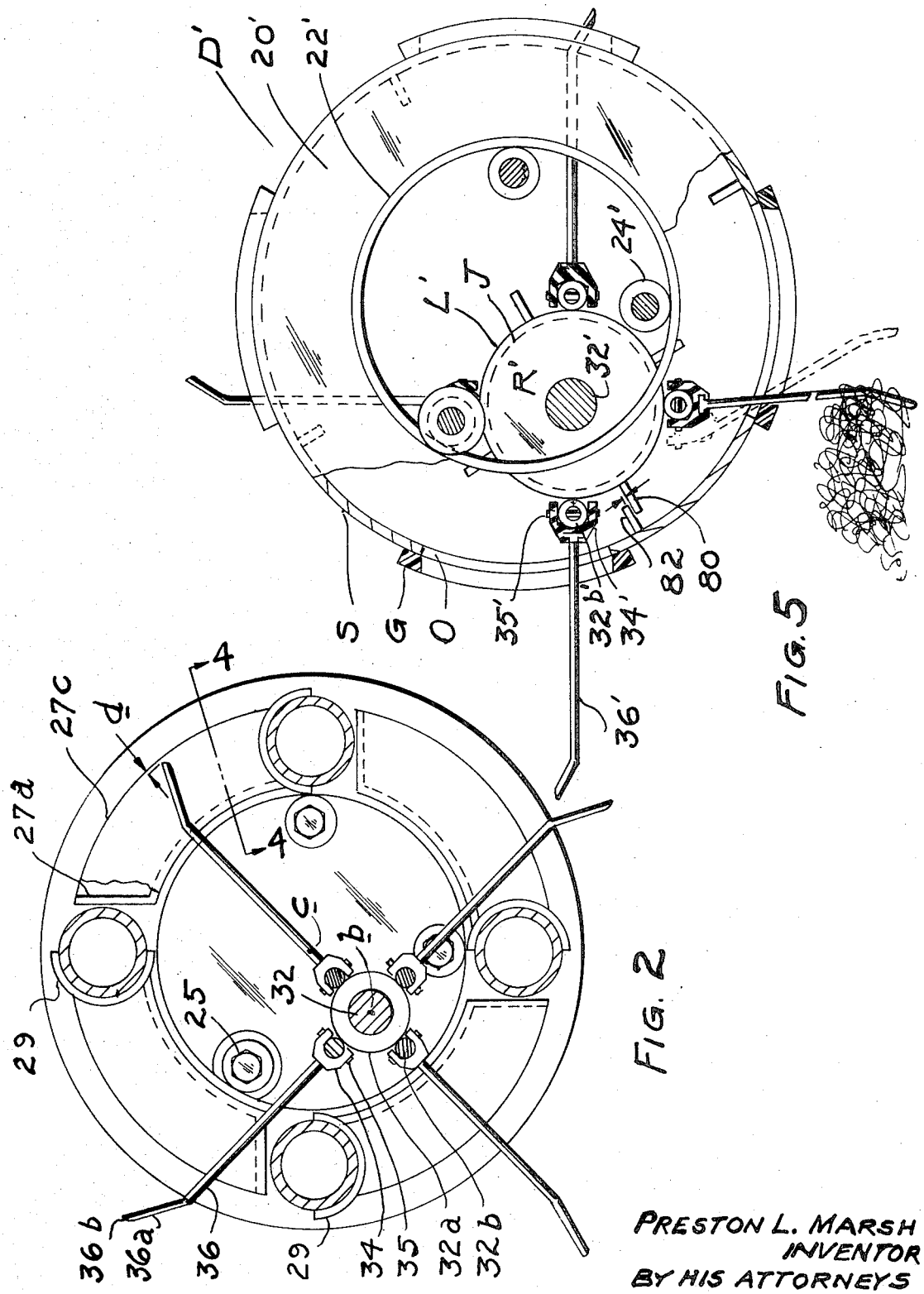

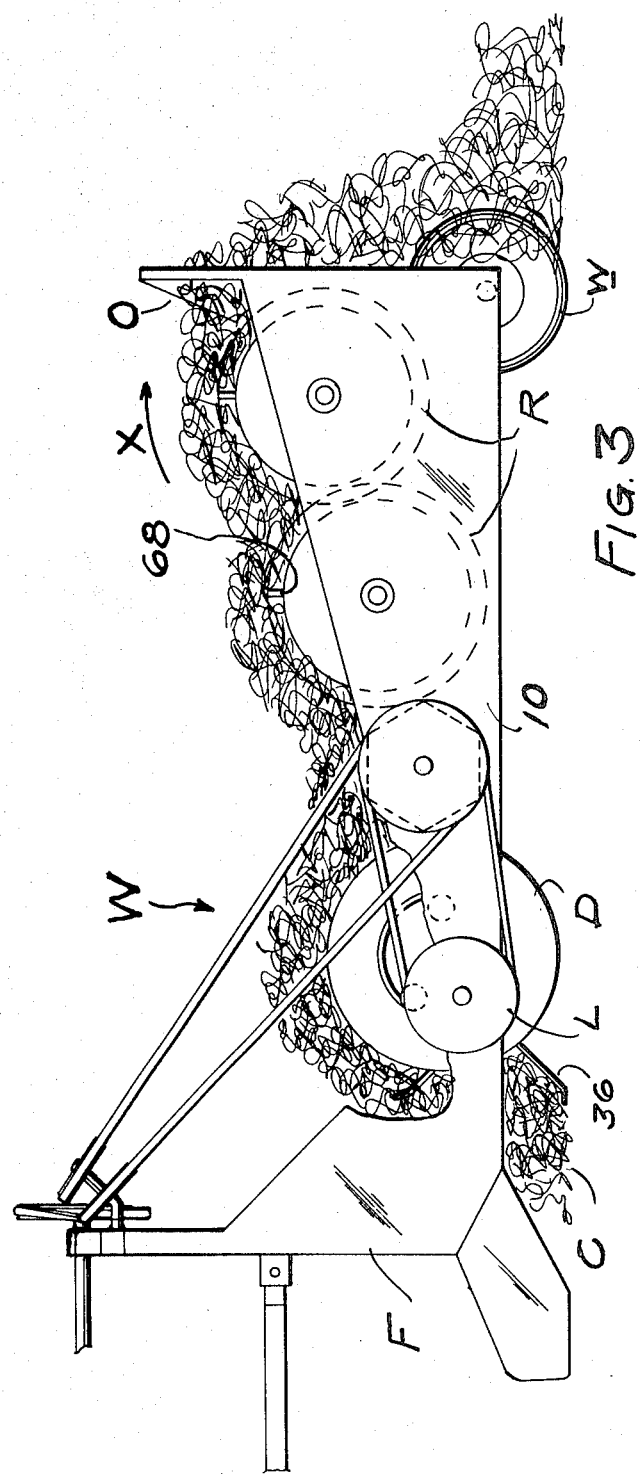
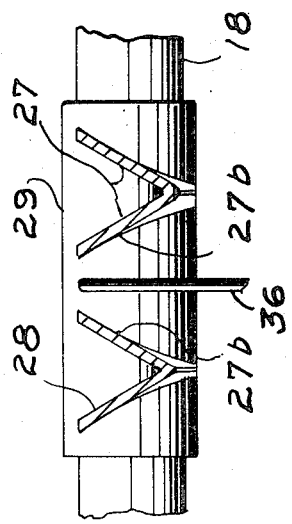

CROP WINDROWING APPARATUS

FIELD OF THE INVENTION

This invention relates to farm machinery for windrowing crops which have been cut or pulled from the ground, and more particularly to a new and improved pick-up assembly for a farm crop windrowing device.

BACKGROUND OF THE INVENTION

Windrowing machines proposed heretofore have required frequent repair because of excessive wear caused by a large number of moving parts. Accordingly, it is an object of the present invention to provide farm crop windrowing apparatus having fewer moving parts, thereby minimizing the maintenance requirements.

The prior art windrowing machines include pick-up headers having pick-up drums provided with tines mounted thereon for picking up crops which previously have been pulled from the ground or severed with a mower. When such machines traverse rough and uneven terrain, the tines frequently engage and become embedded in the ground. Because the drive drum is continuously driven and the tines are not easily removed from the ground, the tines frequently bend or are broken. Accordingly, it is another object of the present invention to provide a farm crop pick-up assembly which will minimize the destruction of pick-up tines.

If the crop being picked up is overly dry, the crop will tend to "shell" and the shelled grain or seeds will spill onto the ground. Accordingly, a further object of the invention is to provide a pick-up assembly which will minimize the loss of shelled grain.

It is another object of the present invention to provide guide mechanism for radially guiding a plurality rotatably mounted pick-up tines which move radially relatively to a cooperating stripper drum for stripping crops picked up by the tine assembly.

Other objects and advantages of the present invention will become apparent to those skilled in the art as the description proceeds.

SUMMARY OF THE INVENTION

Farm crop handling apparatus comprising rotatable crop lifting means including a plurality of tines for lifting a crop upwardly and rearwardly as the apparatus is moved forwardly, and stripper drum means rotatably mounted on the frame about an axis offset from the axis of the crop lifting means for cooperating with the crop lifting means to strip the crop from the tines and propel it rearwardly where it is gathered in a windrow. In one aspect of the invention, the tines drive the drum and in another aspect of the invention, the stripper drum includes a plurality of circumferentially extending troughs for collecting the grain.

The present invention more readily may be understood by reference to the accompanying drawings in which:

FIG. 1 is a fragmentary top plan view illustrating windrowing apparatus constructed according to the present invention;

FIG. 2 is a sectional side view, particularly illustrating the tine assembly and drum, taken along the line 2—2 of FIG. 1;

FIG. 3 is a side elevational view of the windrowing apparatus illustrated in FIG. 1;

FIG. 4 is a sectional view taken along the line 4—4 of FIG. 2 and particularly illustrating the relation between the troughs on the stripper drum and the crop lifting tines; and FIG. 5 is a sectional end view of a cooperating drum and tine assembly constructed according to a modified embodiment of the invention.

GENERAL DESCRIPTION

Windrowing apparatus W constructed according to the invention includes a movable frame F mounting a rotatable crop lifting assembly generally designated L (FIG. 3) having a plurality of tines 36 for lifting the crop C, for example beans, which has been previously mowed or pulled from the ground, and moving it rearwardly. A stripped drum generally designated D is provided for stripping the crop C from the lifting assembly L and further propelling it rearwardly onto a pair of gathering rolls R which move the product in the direction of the arrow $a$ (FIG. 1) to one end of the rolls R where the crop is discharged through a discharge opening O in the rear of the machine.

DESCRIPTION OF THE PREFERRED EMBODIMENT

The movable frame F includes a pair of side walls 10, a front wall 12, and a rear wall 14. A pair of ground engaging wheels $w$ are mounted on the rear wall 14 by suitable trunnions (not shown). A draw bar 16 is pivotally mounted on the front wall 12 for attaching the windrowing apparatus to a draft vehicle.

The stripper drum D includes a plurality of longitudinally extending, parallel rods 18 welded or otherwise suitably secured at their ends to a pair of annular end plates 20. Each of the end plates 20 includes an annular, axially extending flange 22 rotatably supported on circumferentially spaced roller bearing members 24 which are journaled on support bolts 25 that are connected to the walls 10 with nuts 26. Connected to each of the rods 18 are trough members 27 including longitudinally spaced circumferentially extending, curvilinear V-shaped plates 28. A pair of trough members 27 is mounted on each of a plurality of curved mounting plates 29 secured to the rods 18 with bolts 30 threadedly received in suitable tapped openings provided in the rods 18. The trough ends remote from the rods 18 are closed by end walls 27a (FIG. 2). The troughs 27 serve to collect any grain or seed which may be shelled while the crop is being lifted by the tine assembly L, and to propel the shelled grain rearwardly to be suspended in the grain stalks positioned in the windrow. The drum assembly D can also be utilized with other apparatus such as a grain combine and in such instance, the grain collected by the troughs 27 is propelled directly onto the feeder table of the combine and hence much otherwise wasted grain is saved to increase the yield of the crop being harvested.

The tine assembly L for lifting the crop C off the ground and moving it rearwardly over the drum D includes a shaft 32 which passes through the openings in the annular flanges 22 and is journaled in bearings 34 provided in the side walls 10. The shaft 32 includes a plurality of longitudinally spaced, increased diameter portions 32a having circumferentially spaced mounting lugs 32b thereon for receiving tine mounting clevises 34 removably secured thereto with removable locking pins 35. The clevis members 34 are formed of resilient material such as rubber and each mounts a tine 36 having a terminal end portion 36a angled forwardly in the direction of rotation. The tines 36 are longitudinally disposed in rows on the shaft 32 so as to be received within slots 27a (FIG. 4) defined by the radially outwardly converging walls 27b of adjacent ones of the V-shaped plates 28.

The rotational axis $b$ of the tine assembly L is offset from, but parallel to, the axis $c$ of the drum assembly D. Thus, rotation of tine assembly L is eccentric relative to rotation of the drum D so that the tines 36 will protrude to their maximum length along the front and lower side of the drum D to pick up the crop C and carry it around the stripper drum D and then be retracted inwardly through the slots 27a on the stripper drum along the top and rear side of the drum to deposit the crop C on the stripper drum D. As shown in FIG. 2, the terminal portions 36b of the tines 36 are spaced a distance $d$ from the outer periphery of the trough shaped members 27 when the tines 36 pass along the upper, rear portion of the drum D. If the tines 36 are obstructed or deflected sidewise from their normal position, the resilient mounting clevises 34 will also deflect and the tines 36 will be guided by the walls 27b as the tines 36 move radially outwardly.

For rotating the drum D and tine assembly L, a drive shaft 38 is journaled in bearings 40 provided in the walls 10 and mounts and pair of pulleys 42 and 44 on one end and a sprocket 46 and a pulley 48 on the other end. The pulley 42 is driven by a belt 50 which is trained around an idler pulley 51 journaled on a shaft 51a, which is fixed to the front wall 12, and a drive pulley 52 mounted on a drive shaft 53 that is driven by the power takeoff unit (not shown) of a draft vehicle (not shown). The shaft 32 of the tine assembly L is driven by a belt 54 trained around the pulley 44 on shaft 38 and a pulley 56 fixed to the shaft 32.

At the opposite end of the drum D a sprocket 22a is mounted about the annular flange 22 and is driven by a chain 58 trained around sprocket 46 on shaft 38. A shield 60 is attached to the frame F in any suitable manner and extends above the shaft 38 to prevent the crop C from being wound therearound as the crop C is propelled rearwardly.

For gathering the longitudinally spaced crop C into a single windrow (FIG. 1), a pair of drum rolls R is mounted on a pair of shafts 62 journaled in bearings 64 provided in the side walls 10. The drums R include fluted portions 66 for conveying the crop C axially in the direction of the arrow $a$. At one end of each of the drum rolls R a plurality of longitudinally extending, circumferentially spaced paddle members 68 are provided for propelling the gathered windrow C rearwardly through an opening O in the rear wall 14 to form the windrow.

The rearmost shaft 62 mounts a pulley 70 which is driven by a belt 72 trained around the pulley 48 on the shaft 38. The shafts 62 are drivingly connected to each other by a chain 74 trained around sprockets 75 mounted on the shafts 62.

A pair of shoes Y are mounted on the lower forward portion of the side walls 10 for funneling the crop C laterally inwardly toward the tine assembly L and the drum D.

THE OPERATION

The drawbar 16 is connected with a draft vehicle (not shown) which will draw the windrowing apparatus across a field in which the farm crop has been previously mowed or pulled and permitted to dry as required. The drive shaft 63 is drivingly connected with the power takeoff mechanism of the vehicle and the tine assembly L and the drum D are independently driven by the belt 54 and the chain 58 respectively. The tines 36 on the tine assembly L protrude through the openings 27a between the troughs 27 along the front and lower portion of the stripping drum D to lift the scattered crop C and move it rearwardly around the upper portion of drum D. Because the tine assembly L is rotatable about an axis $b$ offset from the axis $c$ of the drum D, the tines 36 move in an eccentric path relative to the movement of the plates 28 of the drum D so as to be retracted through the slots 27a along the top and rear portions of the drum to deposit the scattered crop C thereon. The V-shaped troughs catch the shelled seed and propels it rearwardly with the stalks to be suspended therein. The rotating drum D then further propels the spaced apart crop C rearwardly on to the gathering drum rolls R where it is moved to the right in the direction of arrow $a$ to form a windrow R which is batted rearwardly in the direction of the arrow $x$ by the paddles 68.

It should be understood that the drum D and tine assembly L could be also mounted as a pick-up attachment for a grain combine. In this instance, the troughs formed by the V-shaped plates 28 collect the shelled grain and propel it onto the feeder table of the grain combine.

If the tines 36 are canted sidewise by the crop as the tines 36 move in their eccentric path from positions radially inwardly of the outer surface 27c of the plates 27 to positions radially outward thereof they will be guided by the walls 27b to their radially extending position beyond the outer surface 27c. As is apparent from the drawings, the sum of the axial lengths of the circumferentially outermost crop stripping surface portions 27c is substantially less than the axial length of stripper drum D and substantially less than the sum of the distances between the stripping surface portions 27c to present a relatively small outer surface on which mud and other foreign matter can adhere. Because the circumferentially outer surface includes radial peak portions 27c and axially relieved valley portions therebetween, mud and the like will not readily stick to the outside of the drum.

MODIFIED EMBODIMENT

Referring now more particularly to FIG. 5, a modified drum D' and tine assembly L' are illustrated. The drum D' includes a hollow, cylindrical metal shell S secured to ring shaped end members 20'. The annular ring shaped members 20' are provided with annular flanges 22' rotatably supported on circumferentially spaced roller bearing members 24' mounted on the side walls 10. The shell S includes a plurality of circumferentially spaced rows of longitudinally spaced narrow slots or openings O therein, surrounded by resilient guide members G. The shaft 32' is journaled in the side walls 10.

A cylindrical mounting drum J disposed within the shell S, includes end walls R' fixed to the shaft 32'. A plurality of mounting bars 32b' are circumferentially spaced about the drum R and mount clevises 34', which are formed of suitable resilient material such as rubber. The clevises 34' are removably connected to the members 32' by pins 35'. A plurality of tines 36' are supported by the resilient members 34' and extend through the openings O provided in the shell S.

The drum J also mounts radially outwardly extending, circumferentially spaced safety drive plates 80 which are spaced a distance from a plurality of circumferentially disposed plates 82 extending radially inwardly of the shell S. The drum D' is not driven by a chain 58 as is the drum D in the preferred embodiment. Rather, the drum D' is freely rotatable on the bearings 24' and is driven by the tines 36' which engage the resilient guide members G surrounding the openings O along the lower, forward portion of the shell S. Apparatus for driving the shaft 32' of the tine assembly L' is identical to the apparatus for driving the drum L. If the ends of the tines 36' become embedded in mud, or other obstructing material, as the machine is forwardly drawn, the tines 36' will move from the solid line positions shown in FIG. 5 to dotted line positions shown in FIG. 5, thereby permitting the tine assembly L' to move circumferentially relatively to the drum D'. When the tine assembly L' is moved circumferentially relatively to the drum assembly D' and each of the tines 36' springs from the solid line position shown in FIG. 5 to the chain line position shown in FIG. 5, the drive plates 80 engage the plates 82 to halt the relative displacement and thus prevent the tines 36' from completely passing through the openings O. If the safety plates 80 were not provided, the tines 36' would move entirely within the shell S and thus would not retract.

If the tines 36' become embedded in the mud or ground, they are free to deflect rearwardly on their resilient clevis mountings 34 and move circumferentially relative to the drum D'. The tines are pulled lengthwise from the ground or mud as the tine assembly L' continues to rotate, but do not break or bend because the stripper drum exerts no driving force on the tines.

It is to be understood that the drawings and descriptive matter are in all cases to be interpreted as merely illustrative of the principles of the invention, rather than limiting the same in any way, since it is contemplated that various changes may be made in various elements to achieve like results without departing from the spirit of the invention or the scope of the appended claims.

I claim:
1. Farm crop windrowing apparatus comprising:
a support frame movable in a forward path of travel;
a plurality of longitudinally extending, rotatable bearing means on said frame circumferentially spaced about a first axis;
a longitudinally extending stripper drum including slots spaced along the length of said drum and annular end support flange means received on said bearing means to mount said drum for rotation on said frame about said first axis;
crop lifting means mounted on said frame for rotation about a second axis, spaced from said first axis but within the peripheral extent of said annular flange means, in a path so that a portion thereof will protrude through said slots along the front and lower portion of the drum to pick up crops and carry them partially around said stripper drum and retract through said slots along the top and rear portions of the drum to deposit the crops on the stripper drum, said crop lifting means being disposed in driving relation with said stripper drum; and
means for rotatably driving said crop lifting means to drive said stripper drum.

2. Apparatus as set forth in claim 1 including means for receiving said crops from said drum and moving them longitudinally to gather the crops and discharge the gathered crops in windrows.

3. Farm crop windrowing apparatus as set forth in claim 2 wherein said crop lifting means includes a plurality of tines mounted on a rotatable shaft; and means yieldably connecting said tines to said shaft to permit said crop lifting means to move circumferentially relative to said stripper drum.

4. Farm crop windrowing apparatus as set forth in claim 3 wherein said crop lifting means includes actuator means movable from a non-engaged position into a position of engagement with said stripper drum after relative rotation of said crop lifting means and said drum.

5. The apparatus of claim 3 including a drive member on said lifting means and a drivable member on said drum engageable by said drive member only after said crop lifting means has moved a predetermined distance relative to said stripper drum.

6. Farm crop handling apparatus comprising:
a frame;
a drum mounted on said frame for rotation about an axis and including a plurality of circumferentially extending, longitudinally spaced, curvilinear, radially outwardly opening troughs;
crop lifting means rotatably mounted on said frame about a longitudinal axis; and
means for rotatably driving said drum and crop-lifting means, said crop-lifting means including a plurality of longitudinally spaced and interconnected pick-up tines longitudinally interposed between and movable relatively to said troughs between radially outward positions to pick up crop and radially inner positions to deposit crop on said troughs as said drum and said crop-lifting means are rotated.

7. Farm crop handling apparatus comprising:
a frame;
crop stripping drum means rotatably mounted on said frame including
a plurality of circumferentially spaced, longitudinally extending support bars; and
a plurality of circumferentially extending, longitudinally spaced, curvilinear crop carrying means removably connected to said support bars;
crop lifting means rotatably mounted on said frame for rotation about a longitudinal axis; and means for rotatably driving said drum means and said crop lifting means, said crop lifting means including a plurality of pickup tines mounted for movement, between radially outer and inner positions, between the curvilinear crop carrying means to pick up crops and deposit them on said crop carrying means as said drum means and said crop lifting means are rotated.

8. The apparatus as set forth in claim 7 wherein adjacent ones of said carrier plates include radially outwardly converging walls for guiding the tines between said adjacent plates as they are moved radially outwardly.

9. The apparatus as set forth in claim 7 including a rotatable shaft disposed interiorly of said circumferentially extending carrier plates; and means yieldably mounting said pick-up tines on said shaft.

10. The apparatus as set forth in claim 7 wherein said carrier plates form V-shaped, circumferentially extending, curvilinear troughs closed at their ends.

11. The apparatus as set forth in claim 7 wherein the rotation of said drum propels said crops transversely of said rotational axis; and including means for receiving the crops from said lifting means and discharging said crops in a windrow.

12. The apparatus as set forth in claim 11 wherein said crop receiving means includes a pair of rotatably mounted drum members each having a longitudinally extending screw portion for moving the crop longitudinally to gather the crop; and including means for propelling the gathered crop transversely of the drum members to form said windrow.

13. The apparatus set forth in claim 7 wherein said longitudinal axis is spaced from the rotational axis of said drum.

14. Farm crop pickup apparatus comprising:
crop lifting means rotatable about a longitudinal axis for lifting crop; and
crop stripping means rotatable about a longitudinal axis for stripping the lifted crop from said crop lifting means when said crop lifting means is rotated;
said crop stripping means including a plurality of removably coupled, circumferentially extending, curvilinear, crop carrying means longitudinally spaced to define a plurality of openings between axially adjacent ones thereof;
said crop lifting means including a plurality of pickup tines movable in said openings between radially outer and inner positions to pick up crop and deposit it on said crop stripping means as said crop stripping means and said crop lifting means are rotated.

15. The crop pickup apparatus of claim 14 including means mounting said crop lifting means and said crop stripping means for relative circumferential movement; and means reactable between said stripper means and said crop lifting means after relative movement of said stripping means and said crop lifting means for driving said stripper means with said crop lifting means.

16. Farm crop handling apparatus including:
crop lifting means rotatable about its longitudinal axis for lifting crop;
crop stripping means, capable of limited rotary movement relative to said crop lifting means, rotatable about its longitudinal axis for stripping the crop from said crop lifting means when said crop lifting means is rotated;
said crop stripping means including a plurality of longitudinally spaced openings;
said crop lifting means including a support means interiorly of said stripping means and a plurality of pick-up tines on said support means movable in said openings between radially outer positions to pick up crop and radially inner positions to deposit the picked up crop on said crop stripping means as said crop lifting means and crop stripping means are rotated;
means for rotating said crop lifting means about its axis; and
means reactable between said crop lifting means and said crop stripping means for rotating said crop strip-ping means and said crop lifting means in substantial unison when the crop lifting means is rotated about its axis.

17. The apparatus set forth in claim 16 wherein said stripping means comprises a rotatable, hollow, cylindrical drum and said reactable means is disposed interiorly of said drum and reactable between said support means and said stripping means.

18. Farm crop handling apparatus comprising:
a frame;
a crop lifting assembly mounted on said frame for rotation about a first longitudinally extending axis and including a plurality of circumferentially spaced tines for lifting crops as the assembly is rotated;
means for rotatably driving said crop lifting assembly; and
a stripper drum mounted on said frame for rotation about a second axis, spaced from said first axis, for stripping the crops from said tines and propelling them transversely of the second axis;
said stripper drum including a plurality of openings in the drum surface receiving said tines, said tines being movable relative to said drum between radially projected positions, exteriorly of said drum surface, to pick up said crop and to carry it partially around said stripper drum means as said crop lifting assembly and said stripper drum are rotated, and radially retracted positions to deposit the picked up crop on the stripper drum, said openings being defined by pairs of radially outwardly converging, circumferentially extending, curvilinear plates providing guide means for radially guiding said tines as they move from said retracted positions to said projected positions, the adjacent plates of adjacent openings constituting radially outwardly flaring, circumferentially extending troughs.

19. The apparatus of claim 18 wherein said stripper drum and said lifting assembly are separately driveable and wherein said driving means includes first and second drive means for independently driving said stripper drum and said lifting assembly.

20. The apparatus of claim 18 including conveyor means extending generally parallel to the stripper drum for receiving the crop from said stripper drum and conveying it longitudinally to gather the crop and discharge the gathered crop in a windrow.

21. Farm crop pickup apparatus comprising:

crop lifting means rotatable about a longitudinal axis for lifting crop; and crop stripping means rotatable about a longitudinal axis for stripping the lifted crop from said crop lifting means when said crop lifting means is rotated including a plurality of removably coupled crop carrying means;

each of said crop carrying means including an axially extending support bar and a plurality of circumferentially extending curvilinear crop support means connected to said support bar to define a plurality of openings between axially adjacent ones thereof;

said crop lifting means including a plurality of pickup tines movable in said openings between radially outer and inner positions to pick up crops and deposit them on said crop carrying means as said crop lifting means and said crop stripping means are rotated.

22. The farm crop pickup apparatus as set forth in claim 21 wherein said crop support means includes radially outer, circumferentially extending, axially relieved, crop stripping portions having radially outer crop engaging surfaces, the sum of the axial distances between the radially outer, axially adjacent crop stripping surfaces being substantially greater than the sum of the axial lengths of the crop engaging surfaces of the radially outer relieved portions to inhibit the collection of extraneous material on said stripping means.

* * * * *